United States Patent
Hilton, II et al.

(10) Patent No.: US 6,668,588 B1
(45) Date of Patent: Dec. 30, 2003

(54) METHOD FOR MOLDING CHALCOGENIDE GLASS LENSES

(75) Inventors: Albert Ray Hilton, II, Richardson, TX (US); Albert Ray Hilton, III, Plano, TX (US); William S. Thompson, Lucas, TX (US)

(73) Assignee: Amorphous Materials, Inc., Garland, TX (US)

( * ) Notice: Subject to any disclaimer, the term of this patent is extended or adjusted under 35 U.S.C. 154(b) by 0 days.

(21) Appl. No.: 10/162,561

(22) Filed: Jun. 6, 2002

(51) Int. Cl.$^7$ .......................... C03B 11/08; C03B 23/22
(52) U.S. Cl. .................. 65/37; 65/38; 65/39; 65/42; 65/47; 65/48; 65/153; 65/156; 65/389; 65/102
(58) Field of Search ........................ 65/37, 38, 39, 65/42, 47, 48, 153, 156, 389, 102

(56) References Cited

U.S. PATENT DOCUMENTS

| | | |
|---|---|---|
| 2,026,606 A | 1/1936 | Bausch |
| 2,059,767 A | 11/1936 | Bausch |
| 2,287,191 A | 6/1942 | Morehead |
| 3,130,029 A | 4/1964 | Cala |
| 3,157,521 A | 11/1964 | Carey et al. |
| 3,589,880 A | 6/1971 | Clark |
| 3,843,392 A | 10/1974 | Sterling et al. |
| 3,901,996 A | 8/1975 | Hasegawa et al. |
| 4,159,863 A | 7/1979 | Stewart |
| 4,883,528 A | 11/1989 | Carpenter et al. |
| 5,346,523 A | 9/1994 | Sugai et al. |
| 5,766,294 A | 6/1998 | Takagi et al. |

*Primary Examiner*—Michael Colaianni
(74) *Attorney, Agent, or Firm*—Locke Liddell & Sapp LLP

(57) ABSTRACT

A method for molding a chalcogenide glass lens includes providing a mold. A preformed lens of chalcogenide glass is placed within the mold. The lens has a top surface and a bottom surface. An amount of chalcogenide glass is deposited within the mold and on the top surface of the preformed lens. The mold is heated, such that the chalcogenide glass on the top surface of the preformed lens softens, melts, and bonds to the top surface of the preformed lens. A lens surface is formed in the melted chalcogenide glass to form a molded lens which is bonded to the top surface of the preformed lens. The molded lens and preformed lens assembly is then removed from the mold.

1 Claim, 1 Drawing Sheet

METHOD FOR MOLDING CHALCOGENIDE GLASS LENSES

TECHNICAL FIELD OF THE INVENTION

The present invention relates to a method for molding lenses, and more particularly, a method for molding infrared beam transmitting chalcogenide glass lenses.

BACKGROUND OF THE INVENTION

The use of inexpensive infrared cameras is increasing. Such cameras are being installed in personal passenger automobiles, fire trucks, and police cars. High performance infrared optics are expensive, often costing more than the camera. An infrared beam transmitting lens is generally produced by cutting, grinding, and polishing a block of, for example, germanium. Methods are needed to develop new optical designs and fabrication methods to substantially reduce cost while maintaining system performance.

SUMMARY OF THE INVENTION

In accordance with the present invention, a method for molding a chalcogenide glass lens includes providing a mold. A preformed lens of chalcogenide glass is placed within the mold. The lens has a top surface and a bottom surface. An amount of chalcogenide glass is deposited within the mold and on the top surface of the preformed lens. The mold is heated, such that the chalcogenide glass on the top surface of the preformed lens softens, melts, and bonds to the top surface of the preformed lens. A lens surface is formed in the melted chalcogenide glass to form a molded lens which is bonded to the top surface of the preformed lens. The molded lens and performed lens assembly is then removed from the mold.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
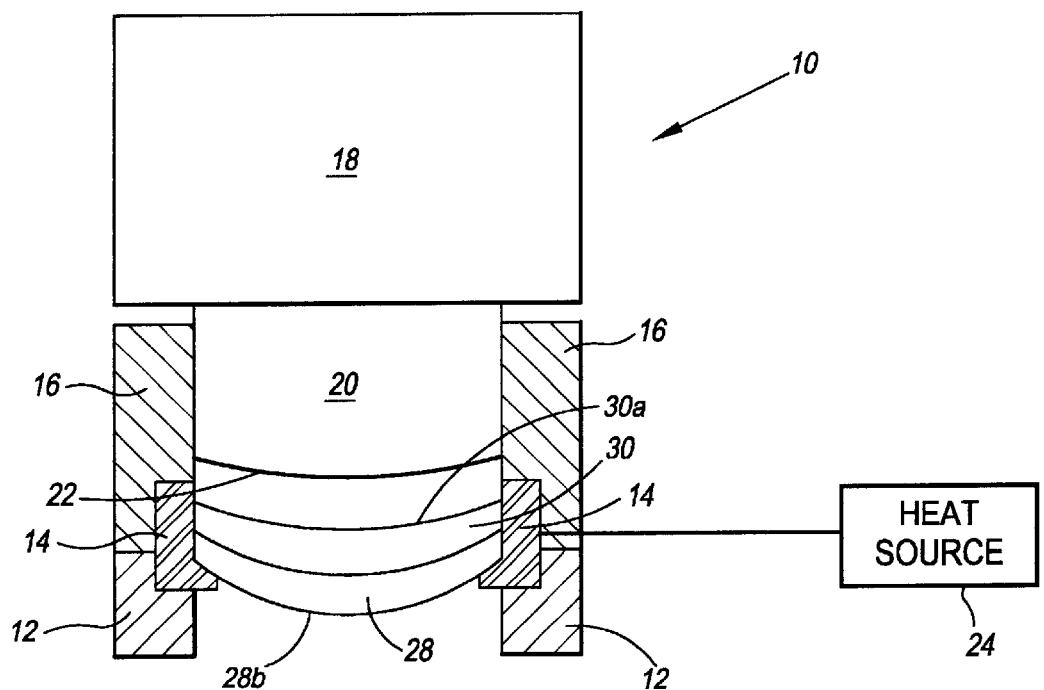
FIG. 1 is a sectional view of a mold assembly for use with the present method.
Figure 2:
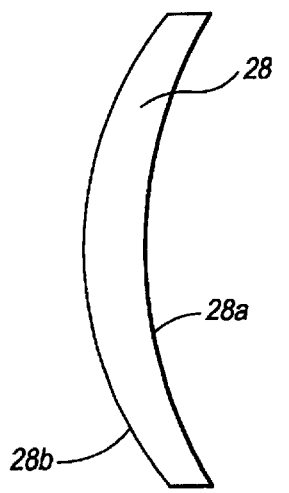
FIG. 2 is a side elevational view of a preformed lens used in the present method.

Referring now to FIG. 1, a mold assembly, generally identified by the numeral 10, for use with the present method is illustrated. Mold assembly 10 includes a base 12, a lens holder 14, a sleeve 16, and a press 18. Base 12, holder 14, and sleeve 16 may be fabricated from aluminum. Attached to press 18 and disposed within sleeve 16 is a mold 20. Mold 20 can be fabricated from, for example, silicate glass, and has a lens forming surface 22. Surface 22 may be formed on mold 20 by diamond turning or conventional optical grinding-polishing processes. FIG. 1 illustrates surface 22 as having an a spheric surface, it being understood that any shaped surface, such as, for example, spherical can also be utilized with the present method.

Holder 14 is heated using a heat source 24.

Figure 3:
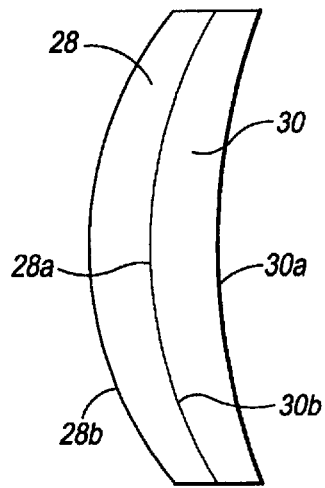
FIG. 3 is a side elevational view of a lens fabricated in accordance with the present method.

In accordance with the present method, a preformed lens 28 formed from chalcogenide glasses, and ground and polished in a standard fashion is placed within holder 14. The chalcogenide glass of lens 28 is comprised of compounds selected from the group consisting of sulfur, selenium, tellurium and combinations thereof. Lens 28 is illustrated in FIG. 3 and includes a top surface 28a and a bottom surface 28b. An amount of low melting chalcogenide glass in the form of, for example, a disc or pulverized glass is deposited within holder 14 and on top surface 28a of lens 28. The chalcogenide glass is heated using heat source 24 such that the glass softens, melts, and spreads over top surface 28a of lens 28, thereby wetting and bonding to surface 28a. The glass deposited onto the surface 28a of lens 28 has a softening point that is less than the softening point of the glass of lens 28. The glass deposited onto the surface 28a of lens 28 is comprised of compounds selected from the group consisting of sulfur, selenium, tellurium and combinations thereof. Press 18 then moves mold 20 within sleeve 16 to cause mold surface 22 to engage the molten chalcogenide glass to thereby form a lens 30 having a top surface 30a and a bottom surface 30b. Top surface 30a replicates the shape of mold surface 22. Bottom surface 30b of lens 30 is bonded to top surface 28a of lens 28 as illustrated in FIG. 3. Mold assembly 10 is cooled and the resulting lens assembly is removed.

The resulting lens assembly has no air space between surfaces 30b and 28a and does not require an entire reflective coating.

It therefore can be seen that the present method provides for the formation of a molded doublet lens utilizing a relatively inexpensive process which results in high performance levels.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A method for molding an infrared transmitting chalcogenide glass lens comprising:

providing a mold;

placing a preformed lens of chalcogenide glass comprising compounds selected from the group consisting of sulfur, selenium, tellurium and combinations thereof, within the mold, the lens having a top surface and a bottom surface;

depositing an amount of chalcogenide glass comprising compounds selected from the group consisting of sulfur, selenium, tellurium and combinations thereof, within the mold and on the top surface of the preformed lens;

heating the mold, such that the chalcogenide glass deposited on the top surface of the preformed lens softens, melts and bonds to the top surface of the preformed lens;

forming in the mold a desired lens surface in the melted chalcogenide glass to form a molded chalcogenide lens which is bonded to the top surface of the preformed lens; and removing the molded lens and preformed lens assembly from the mold.

\* \* \* \* \*